United States Patent [19]

Patecell

[11] 4,453,582
[45] Jun. 12, 1984

[54] AIR RETAINING AND BEAD-SEAT-LOCK DEVICE FOR PNEUMATIC TIRE WHEELS

[76] Inventor: Theodore C. Patecell, 33-52 156th St., Flushing, N.Y. 11354

[21] Appl. No.: 331,521

[22] Filed: Dec. 17, 1981

[51] Int. Cl.$^3$ ........................ B60B 25/20; B60C 15/02
[52] U.S. Cl. ............................... 152/379.4; 152/381.4
[58] Field of Search ............... 152/379.4, 379.3, 379.5, 152/381.3, 381.4, 362 R, 307; 301/95–97

[56] References Cited

U.S. PATENT DOCUMENTS

| | | | |
|---|---|---|---|
| 2,409,666 | 10/1946 | Comey | 152/379.4 X |
| 3,930,527 | 1/1976 | French | 152/379.4 X |

FOREIGN PATENT DOCUMENTS

| | | | |
|---|---|---|---|
| 2031735 | 1/1971 | Fed. Rep. of Germany | 152/379.3 |
| 2348863 | 4/1975 | Fed. Rep. of Germany | 152/379.3 |

Primary Examiner—Robert B. Reeves
Assistant Examiner—Russell D. Stormer
Attorney, Agent, or Firm—Howard E. Thompson, Jr.

[57] ABSTRACT

An air retaining and bead-seat-lock device for pneumatic tire wheels is provided having air retaining engagement with an aperture in a tire rim adjacent the seated tire bead, and having two positions of operative engagement with the rim, one position disposing the inner end of the device substantially flush with the inner rim surface facilitating air-pressure seating of the tire bead against the rim flange, and the other position disposing an end to protrude beyond the inner rim surface adjacent the tire bead to support the same in seating engagement with the rim flange. In its simplest form the device comprises an elongated threaded shank closely fitting a threaded aperture in the rim and having an enlarged head externally of the rim adapted for clamping an air sealing gasket against the rim, and being movable between the first and second positions by rotating the threaded shank to appropriately position its inner end. In another adaptation of the invention the device is intended for reversible positioning with respect to the rim and is provided with a central wrench engaging enlargement with threaded studs at each side thereof of a length to extend through a sealing gasket and the rim wall, with the stud at one side having an unthreaded extension adapted to protrude at least ½" beyond the inner rim surface. In a preferred adaptation of the invention, the device comprises an axially movable cylindrical shank passing through an externally threaded stud secured outwardly of the tire rim in alignment with the aperture therein, said stud carrying clamping means for a packing element circumferentially of said shank for air sealing and axial positioning of said shank.

The device is used in pairs, axially aligned on the rim adjacent the opposed rim flanges with two or more pairs being employed at uniformly spaced intervals circumferentially of the rim.

8 Claims, 8 Drawing Figures

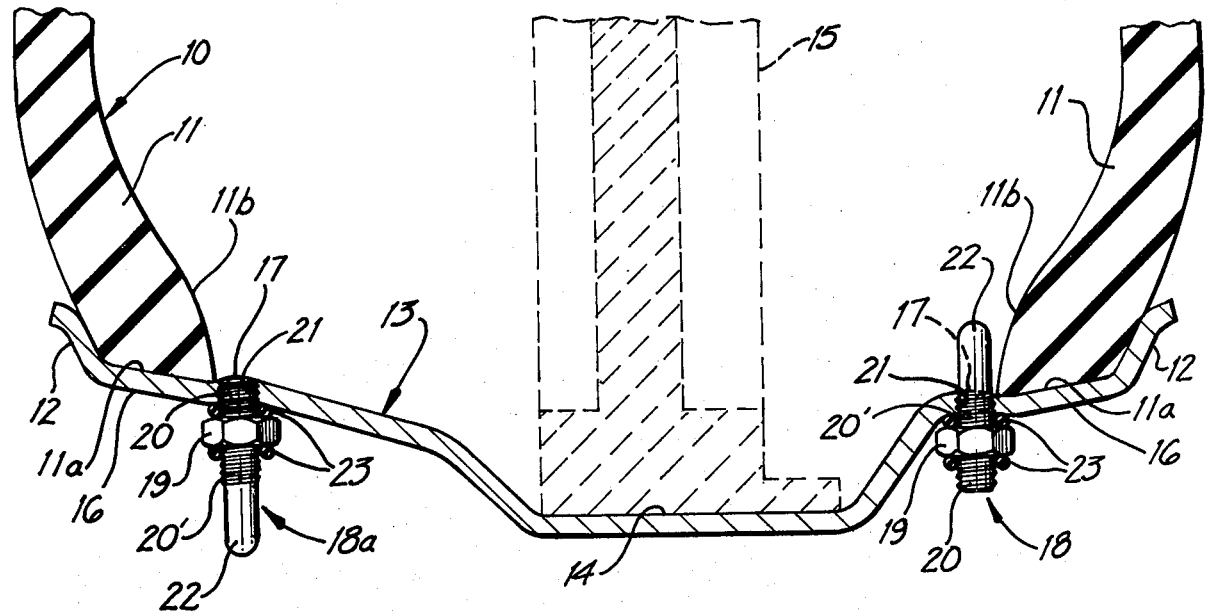
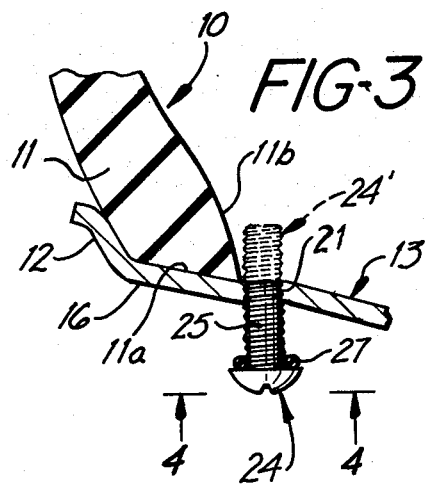
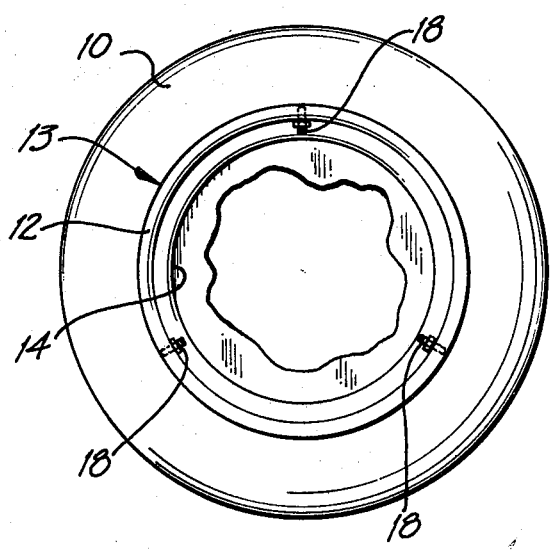

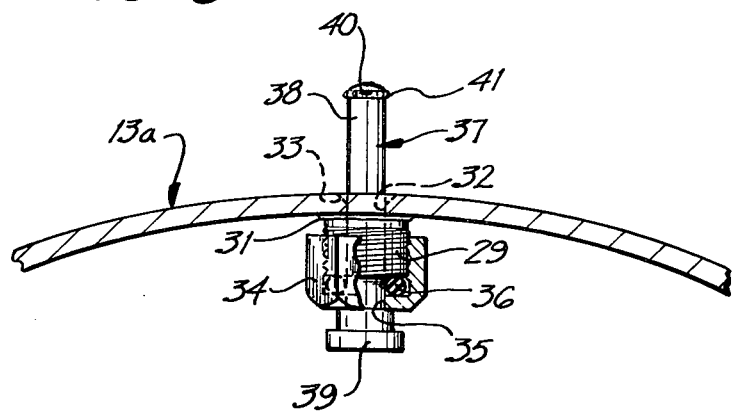
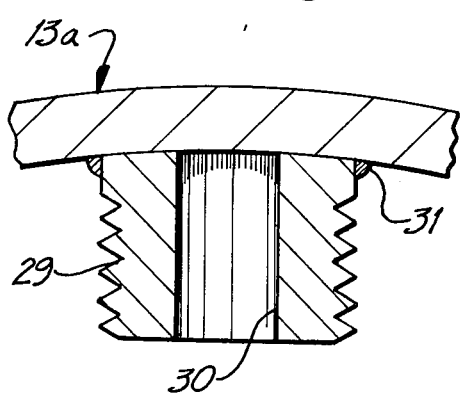
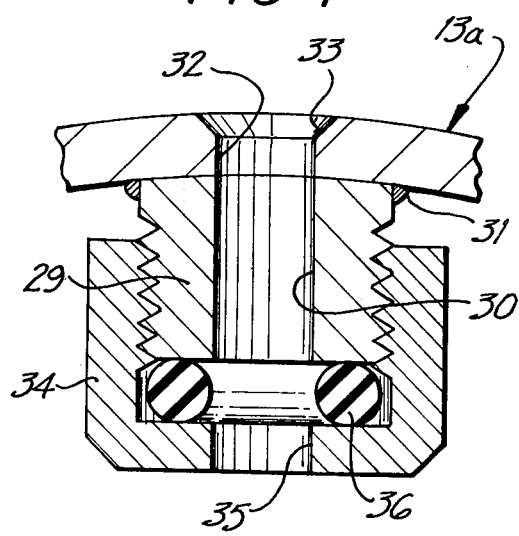
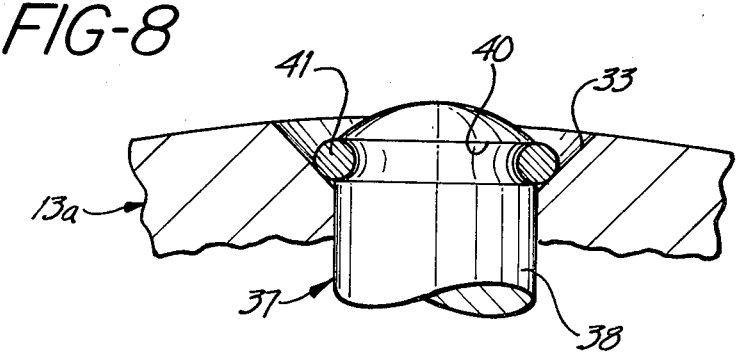

AIR RETAINING AND BEAD-SEAT-LOCK DEVICE FOR PNEUMATIC TIRE WHEELS

This invention relates to an air retaining and bead-seat-lock device for pneumatic tire wheels having air retaining engagement with a tire rim adjacent the seated tire bead and having two positions of operative engagement with the rim, one position disposing the inner end of the device substantially flush with the inner rim surface facilitating air-pressure seating of the tire bead against the rim flange, and the other position disposing an end to protrude beyond the inner rim surface adjacent the tire bead to support the same in seating engagement with the rim flange. In its simplest form the device comprises an elongated threaded shank closely fitting a threaded aperture in the rim and having an enlarged head externally of the rim adapted for clamping an air sealing gasket against the rim, and being movable between the first and second positions by rotating the threaded shank to appropriately position its inner end. In another adaptation of the invention the device is intended for reversible positioning with respect to the rim and is provided with a central wrench engaging enlargement with threaded studs at each side thereof of a length to extend through a sealing gasket and the rim wall, with the stud at one side having an unthreaded extension adapted to protrude at least ⅛" beyond the inner rim surface. In a preferred adaptation of the invention, the device comprises an axially movable cylindrical shank passing through an externally threaded stud secured outwardly of the tire rim in alignment with the aperture therein, said stud carrying clamping means for a packing element circumferentially of said shank for air sealing and axial positioning of said shank.

The device is used in pairs, axially aligned on the rim adjacent the opposed rim flanges with two or more pairs being employed at uniformly spaced intervals circumferentially of the rim.

Safety during run-flat operation of vehicles equipped with pneumatic tires having peripheral beads at the inner diameter thereof, seating against flanges of a wheel rim, has long been a problem. Whereas internal air pressure normally supports the tire beads in firm engagement with the rim flanges, such support is lost when the tire becomes deflated. Tremendous forces are built up in the tire wall in the load bearing area when a vehicle is in motion because the much larger outer circumference of the tire must constantly move past, while rubbing against, the smaller circumference of the bead portions. These forces tend to unseat the tire beads permitting them to move transversly of the wheel and to fall into the drop center of conventional wheels equipped with drop center. Such unseating not only destroys braking power for the affected wheel but permits the tire, in the load bearing area, to grotesquely distort in a manner to impede the vehicle's stability and even permit the tire to be thrown from the rim. The detrimental effect increases greatly with increases in vehicle speed; and many serious accidents have been caused by loss of control due to blow outs, even while driving at relatively moderate speeds.

An approach for dealing with this problem has been provided in Patecell U.S. Pat. No. Re. 28,196 by employing a rotatable ring member in engagement with a rim drop center and projecting beyond the rim flanges approximately ½ the distance between the rim flanges and the inner surface of an inflated tire. With this type of run-flat insert which is known as a "safety roller" what happens during run-flat operation is that in the load bearing area the inner surface of the tire tread is forced against the outer surface of the insert causing it to rotate with respect to the wheel, and in so doing to feed the larger circumference tread portion of the tire past the smaller circumference bead portions with a minimum of distorting force being transmitted to the bead portions. Years of experience with the Patecell insert on security vehicles and the like has demonstrated that the "safety roller" will generally maintain effective bead seating and braking power even in the event of high speed blowouts; and even in instances where bead seating and braking power may be lost, the tire beads are prevented by the insert from falling into the drop center to permit the type of tire distortion that leads to loss of control of the vehicle.

All tubeless rims must have at least 5° taper. For tubeless tire vehicles wheels equipped with drop centers, the rim surface adjacent the flanges is not cylindrical but is tapered slightly toward the drop center with the tire beads being similarly tapered to provide a wedge like fit during pressure seating of the beads on the rim. In most passenger and light commercial vehicles such taper is about 5°, with a tire bead seating hump, whereas in trunks and other heavy vehicles the taper may be as much as 15°.

While the "safety roller" insert of Patecell U.S. Pat. No. Re. 28,196 generally maintains bead seating and braking power during run-flat operation in lighter vehicles for which the engaged wheel and bead contours are tapered 5°, with bead seating humps, the chances of loss of bead seating and braking power, even with the 5° taper, increase as the vehicle weight and required maneuvering increases; and with the 15° taper characteristically employed in trunks and heavy vehicles, the "safety roller" alone is incapable of preventing loss of bead seating and braking power.

It has been found in accordance with the present invention that this problem of loss of bead seating and braking power in heavy vehicles, trucks and the like can be overcome by providing at two or more points equally spaced circumferentially of the wheel, and adjacent the inner edge of each tire bead, movable bearing members which will support the mounted tire bead in firm engagement with the associated rim flange. The bearing members must be movable between operative and inoperative positions in order to facilitate the operation of tire mounting and dismounting, and hence must be accessible externally of the wheel; yet they cannot be simply removed because air pressure within the tire is needed to effect proper bead seating. The problem is uniquely solved by providing a unitary device having a central hex nut or other wrench engaging enlargement between two short threaded studs of a length equal to the thickness of the wheel rim and a sealing gasket externally thereof, with one of the studs having an unthreaded extension at least ⅛" in length which will protrude beyond the threaded aperture internally of the wheel to provide the stop member engaging the tire bead.

In practice wheels should be provided with the devices mounted with the short studs in engagement with the wheel so that the inner surface of the wheel is unobstructed during mounting and air pressure seating of the tire beads. After bead seating, air pressure is released and the devices are removed and reinserted in the reverse position with the stud extensions internally of the assemblage and bearing against the seated tire bead. When dismounting of the tire is desired, this procedure is reversed.

In a simpler form of the device it is possible to employ an elongated threaded shank having an external enlargement for engagement with a seating gasket and being appropriately fashioned to permit controlled rotation. The enlargement, for example, can be shaped to receive an internal or external wrench or screw driver of a particular type. The threaded shank should be at least ½" longer than the thickness of the rim wall and the air sealing gasket to be used. With this device the threaded shank will be only partially inserted in a threaded aperture in the rim so as not to protrude beyond the inner surface during tire mounting operations. As thus partially inserted the device, although not air tight, will sufficiently restrict air passage to permit air pressure seating of the tire beads. Once the tire beads are properly seated the devices are rotatably advanced to provide air sealing engagement of the gasket against the outer rim surface while projecting the threaded shank into bearing engagement with the seated tire bead.

In a further adaptation of the invention, movement of the bead seat lock element can be controlled by clamp means externally of the rim comprising a short, externally threaded stud having an axial bore of a size to receive a cylindrical shank. The threaded stud can have a separate threaded portion for sealing engagement with a threaded hole in the rim, but with certain type rims the stud can be welded externally of the wheel at each point where a bead-seat-lock device is desired prior to forming a hole in the rim. Then, with the axial bore as a guide, and with the drill size used to form said bore, an aligned hole is drilled in the rim followed by the formation of a slight annular counter-sink at the inner side of the hole thus formed. An internally threaded cap having an external hex-nut or other wrench engaging configuration and an end aperture of the same diameter as said bore is mounted on the stud with an appropriate size O-ring between the stud end and the inner surface of the cap. An elongated cylindrical shank closely fitting the diameter of said bore having a grasping enlargement at its outer end and a shallow annular groove at its inner end is passed through the assemblage from the outer side to a point beyond the inner surface of the rim and a split ring is inserted in the annular groove at the inner end of the shank.

The shank length should be such as to protrude at least ½" beyond the inner surface of the rim in its innermost position of adjustment to provide effective locking engagement with the tire bead, and when the cap member is tightened to compress the O-ring gasket the assemblage provides effective air sealing around the shank and firm support of the shank in its operative position. When it is desired to mount or dismount a tire the cap is merely rotated to relax compression on the O-ring, permitting the shank to be grasped by its outer end enlargement and axially moved outwardly until the split ring at the inner end of the shank reaches a stop position in engagement with the annular counter-sink at the inner end of the hole in the rim. In this position the inner end of the shank is substantially flush with the inner surface of the rim permitting free movement of the tire bead past the now inoperative seat-lock device during tire mounting and dismounting operations.

This adaptation of the invention has certain inherent advantages in that, once assembled to the rim, it can be moved between operative and inoperative positions without detachment of any parts from the rim or the risk of inadvertent loss of parts. Furthermore, the welding of the studs surrounding the holes formed in the rim serves to counteract any possible weakening of the rim structure by reason of the holes formed to accommodate the bead-seat-lock devices.

The number of bead-seat-lock devices to be employed will vary depending upon wheel size, vehicle weight, and degree of taper in the engaged portions of the wheel and tire bead. The devices should be used in sets opposed to each other in a direction parallel to the wheel axis, and a minimum of two sets at dimetrically opposed positions on the wheel should be used to maintain wheel balance. As the number of sets is increased to three, four or more as dictated by wheel size and vehicle weight, they should be uniformly spaced circumferentially of the wheel to maintain wheel balance.

While the bead-seat-lock device has been developed primarily as an adjunct to "safety rollers" of the type disclosed in Patecell U.S. Pat. No. Re. 28,196, it should be understood that the device can be advantageously employed in any inflatable tire and wheel assemblage whether or not it contains a "safety roller" or other run-flat insert, because even without the run-flat insert the bead-seat-lock device effectively prevents the loss of bead seating and braking power during run-flat operation. Thus the device, in any of the forms above-described, can readily be adapted to existing vehicles, and in so doing eliminate the danger of catastrophic loss of control in the event of high speed blowouts and the like.

Tests to date have indicated that the relatively small size of the tapped holes in the rim do not impair the strength or structural integrity of the rim. If, with a particular type or size of rim, there should be a question that the tapped holes might cause a rim structural problem, this could be corrected by welding to the rim washer like plates of suitable thickness surrounding the holes, or even welding to the rim circular plates prior to drilling and tapping. In the latter event the threaded portions of the bead-seat-lock devices would, of course, be lengthened.

A preliminary patent search has failed to reveal any prior art directly suggesting the concepts of the present invention.

U.S. Pat. No. 2,427,216 to H. T. Kraft issued Sept. 9, 1947 shows, in connection with a tire using an inner tube, a removable device having threaded engagement into the tire bead. Not only are the problems quite different with a tubeless tire but it is questioned whether the tapered thread entering the tire bead can provide effective support against the type of forces generated when a high speed blowout is encountered.

U.S. Pat. No. 2,409,666 to F. H. Comey issued Oct. 22, 1946 shows a bead clamp device requiring a large aperture in the rim with the assemblage being held to the rim by an offset inner end of the device clamping to the tire bead. This device makes no provision for the air pressure seating of tire beads; and the large and numerous apertures required could seriously weaken the rim structure.

U.S. Pat. Nos. 3,903,946 issued Sept. 9, 1975 and 3,916,370 issued Nov. 4, 1975 disclose complex deformable inserts for engaging tire beads which appear to make no provision for the pressure air seating of tire beads and which, when once installed, would seem to make tire change extremely difficult. These patents are mainly for special flat two-piece rims. In case of adaptation to standard one-piece drop center wheels, the large holes in the rims would weaken the rim structure in addition to providing no means for sealing the large hole for air pressure tire bead seating.

The bead-seat-lock device of the present invention will be more fully understood from consideration of the following description having reference to the accompanying drawing in which preferred adaptations have been illustrated with the parts thereof identified by suitable reference characters, and in which:

FIG. 1 is a fragmentary sectional view through a tire and rim assemblage showing bead-seat-lock devices aligned axially of the wheel with one of the devices oriented to permit tire mounting and dismounting and the other device oriented in its bead-seat-lock position.

FIG. 2 is a side view of a tire and rim assemblage, with hub details omitted, showing a typical circumferential spacing of bead-seat-lock devices.

FIG. 3 is a fragmentary view of a portion of the structure shown in FIG. 1 illustrating a modified form of bead-seat-lock device.

FIG. 4 is a view taken on the line 4—4 of FIG. 3.

FIG. 5 is a fragmentary side elevation view of a wheel rim with a modified form of bead-seat-lock shown in operative position, and with part of the structure broken away and in section.

FIG. 6 is an enlarged sectional view of part of the structure shown in FIG. 5 prior to drilling through the rim.

FIG. 7 is a view similar to FIG. 6 after drilling of the rim hole, and showing related parts in section.

FIG. 8 is an enlarged detail of a portion of the structure shown in FIG. 5 with the bead-seat-lock in inoperative position.

FIG. 1 of the drawing shows a fragmentary section parallel to the wheel axis through a typical tubeless tire and rim assemblage in which the tire 10 has beads 11 seating against flanges 12 of a rim 13 having a central drop center 14 which accommodates the beads 11 during tire mounting and dismounting operations. The drop center 14 may, if desired, carry a run-flat insert 15, suitably of the "safety roller" type shown in U.S. Pat. No. Re. 28,196.

The inner periphery 11a of the tire bead seats against an annular rim portion 16 which in drop center rims is generally tapered to exert an expanding wedge like action on the tire bead as bead seating is accomplished by applying air pressure within the tire. The angle of taper can vary considerably, generally being on the order of 5° for smaller wheels of the type used on pleasure vehicles and smaller commercial vehicles, but increasing to about 15° in the larger wheels for buses, trucks and other heavy vehicles.

Most rims are provided, inwardly of the tapered portion 16, with annular radial protrusions or humps 17 in alignment with the inner edge 11b of the tire bead as a means for assisting in the obtaining and maintaining of proper bead seating. The humps 17 are insufficient, however, to prevent unseating of the tire beads during run-flat operation with a result that one or both beads 11 can slide into the drop center 14. This is doubly detrimental because of loss of braking action and erratic bunching of the collapsed tire causing vehicle instability and loss of steering control if the run-flat condition is experienced in a front wheel.

Prevention of such unseating of the tire beads during run-flat operation is accomplished in accordance with the present invention by mounting sets of bead-seat-lock devices 18 adjacent inner surfaces 11b of the tire beads at opposed points aligned with the wheel axis with plurality of such opposed sets of seat lock devices being equally spaced circumferentially of the rim. FIG. 2 shows three sets of seat-lock devices 18 spaced 120° apart, but it will be understood that with small wheels and light weight vehicles two sets spaced 180° apart will be sufficient; whereas with larger wheels and heavier vehicles, and particularly with increase in the angularity "A" of annular rim sections 16 and associated bead surfaces 11a, the number of sets can be increased to four or more. As a general rule with tire and rim assemblages in which angularity "A" does not exceed 5° the number of sets of bead lock devices 18 will be in the range of 2 to 4, whereas with assemblages in which the angularity "A" is of the order of 15°, as with trucks, buses and the like, 4 or more circumferentially spaced sets of bead lock devices 18 should be employed.

As shown in FIG. 1 the bead-seat-lock device 18 comprises a unitary member having a central enlargement 19 of hex-nut or other wrench engaging contour with short threaded studs 20,20' protruding from opposed sides thereof for engagement with threaded apertures 21 in the rim in general alignment with the hump portion 17. One of the threaded studs 20' has an integral unthreaded portion 22 which, as seen in the right hand showing of FIG. 1, protrudes inwardly of the rim 13 closely adjacent inner edge 11b of the tire bead.

The length of the studs 20,20' is such as to terminate substantially flush with the inner surface of the rim 13 as the device 18 is rotated to clamp an O-ring or other sealing gasket 23 against the outer surface of the rim.

When it is desired to dismount the tire the device 18 is removed from the position shown at the right in FIG. 1 and reinserted in the position shown at 18a at the left of FIG. 1 with threaded stud 20 now engaging the aperture 21. In this orientation the tire bead 11 is free to pass over hump 17 during dismounting operation and similarly free to pass over hump 17 during air pressure bead seating in the tire mounting operation. It should be noted in this connection that after air pressure seating of the tire beads during tire mounting with the bead-seat-lock devices as at 18a at the left hand side of FIG. 1 the devices are removed and reinserted in the orientation shown at 18 in the right hand side of FIG. 1. Thus the FIG. 1 showing can be visualized as an intermediate stage of preparation for tire dismounting or completion of tire mounting.

With the bead-seat-lock devices shown in FIG. 1 having gasket means 23 on both sides of enlargement 19, it will be apparent, that even with the device oriented as shown at 18a, clamping of the gasket 23 provides an air tight seal permitting use of the inflated tire if desired. Thus when supplied as original equipment, wheel rims 13 can be supplied with the bead-seat-lock devices preassembled in the 18a orientation, with tire mounting and vehicle completion and delivery proceeding as if the bead-seat-lock devices were not present. The step of reorienting the bead-seat-lock device to the position shown at 18 at the right hand portion of FIG. 1 can be accomplished at any subsequent time by the automotive dealer or by the ultimate purchaser.

It will be noted, however, that the bead-seat-lock device as shown in FIG. 1 lends itself to easy addition to existing vehicles by merely drilling and tapping apertures 21 in the rim 13 to receive the studs 20,20' at the desired locations circumferentially of the rim 13.

As thus adapted to existing equipment the bead-seat-lock device can be of the simplified form shown at 24 in FIGS. 3 and 4. This simplified device comprises a threaded shank 25 for engagement with the threaded aperture 21 and has at one end an enlarged head 26 for clamping a gasket 27 against the outer surface of the rim 13. The enlarged head 26 is fashioned to facilitate rotary adjustment with a socket 28 for receiving a Philips type screw driver being shown in FIG. 4 for purpose of illustration.

With the simplified device shown in FIGS. 3 and 4, partial insertion into the aperture 21, with the inner end of the shank 25 being flush with the inner surface of the rim 13, will sufficiently restrict the passage of air to permit the air pressure seating of the tire bead 11 against the rim flange 12. Once the tire bead is properly seated the device 24 is advanced to the dotted line position 24' to provide air tight clamping of the gasket 27 against the outer surface of the rim 13 while providing a seat lock projection adjacent inner edge 11b of the tire bead.

In the modified form of bead-seat-lock device shown in FIGS. 5 to 8 it will be noted that at each point where a bead-seat-lock device is to be positioned on wheel rim 13a a short externally threaded stud 29 having an axial bore or passage 30 is welded to the rim as indicated at 31. After welding, and with the bore 30 as a guide, a hole 32 is drilled through the rim 13a coextensive with the bore 30, and at the inner end of the hole 32 a slight counter-sink 33 is formed.

An internally threaded cap 34 having an end aperture 35 the same size as, and in alignment with, the bore 30 is mounted on the externally threaded stud 29 with an O-ring disposed between the end of the stud 29 and the inner surface of the cap 34.

A bead-seat-lock element 37 in the form of an elongated shank 38 having enlarged outer gripping end 39 and an annular groove 40 at the inner end thereof is passed through the FIG. 7 assemblage, and a split ring 41 is inserted in the groove 40.

As the shank 38 is moved outwardly the split ring 41, having slight radial protrusion from the shank 38, bears against the counter-sink portion 33 to stop outward movement of the shank 30 in substantial alignment with the inner surface of rim 13a. In this position of the device a tire bead can be readily moved past the bead-seat-lock element 37 in tire mounting and dismounting operations. After tire mounting the bead-seat-lock element 37 is pushed inwardly to the position shown in FIG. 5, and the cap 34 is tightened to compress O-ring 36, thereby providing effective air sealing around the shank 38 and firmly positioning the shank 38 in its operative position.

In the event that the threaded stud 29 can not be welded to the rim such as for highly stressed rims of steel or Aluminum, an alternate threaded attachment will be provided by a different diameter threaded portion to stud 29 such as a pipe thread or SAE fine thread and a mating thread tapped thru the rim, as in FIG. 1.

It will be noted that with this adaptation the bead-seat-lock assemblage is integral with the wheel rim and can be adjusted between its operative and inoperative positions without the chance of any parts being inadvertently misplaced.

With any of the forms of the device above-described the inwardly extended portion, when in operative position, should protrude at least ¼" beyond the inner surface of the rim; and for light weight vehicles the rim apertures 21,32 can be of the order of 3/16" in diameter.

On the other hand as adapted to bead seating on buses, trucks and other heavy vehicles the size of the device should be appropriately increased, as, for example, by providing rim apertures 21,32 of the order of ¼" to ⅜" in diameter and a protrusion inwardly of the rim, when in operative position, of about ¾" to 1".

The bead-seat-lock device as herein described provides an added element of safety in any uses of pneumatic tires by preserving braking power and steering control during run-flat operation through maintaining the tire beads in close seating engagement with the rim flanges. With heavy sidewalled tires which remain partially load bearing even when deflated, the use of the bead-seat-lock devices will permit extended run-flat operation without appreciable tire damage. On the other hand, with conventional tires having relatively thin sidewalls, the prevention of tire damage during extended run-flat operation will require the use of a run-flat insert, suitably of the type disclosed in U.S. Pat. No. Re. 28,196, to prevent full collapse of the deflated tire in the load bearing zone and to aid in feeding the larger diameter tread portion through the load bearing zone.

Various changes and modifications in the bead-seat-lock device as herein disclosed may occur to those skilled in the art; and to the extent that such changes and modifications are embraced by the appended claims, it is to be understood that they constitute part of the present invention.

I claim:

1. An air retaining and bead-seat-lock device for pneumatic tire wheels, said device comprising an elongated unitary member having air retaining engagement with an aperture in a tire rim adjacent the seated tire bead, said device having two end-to-end reversible positions of operative engagement with the rim, one position of operative engagement disposing one end of the device substantially flush with the inner rim surface facilitating air pressure seating of the tire bead against the rim flange, and the other position of operative engagement disposing the other end to protrude beyond the inner rim surface adjacent the tire bead to support the same in seating engagement with the rim flange, said device further comprising a unitary member having a central, wrench engaging enlargement, short threaded studs at opposed sides of said enlargement having interchangeable close threaded engagement with said rim aperture, said wrench engaging enlargement being of a size to provide effective clamping engagement of gasket means disposed between said enlargement and the outer rim surface, one of said studs having a coaxial, unthreaded extension adapted to protrude at least ¼" beyond the inner surface of said rim, said device when positioned to dispose said extension inside the rim providing a bead-seat-lock supporting the tire bead in engagement with the rim flange, and said device when oriented to engage the other stud with said rim aperture permitting free bead movement past said aperture during mounting and dismounting of a tire.

2. An air retaining and bead-seat-lock device as defined in claim 1, wherein said threaded studs are of a length to dispose the ends of the threaded portions thereof substantially flush with the inner surface of said rim when intended gasket means is disposed between said enlargement and rim.

3. An air retaining and bead-seat-lock device for pneumatic tire wheels, said device comprising an elongated unitary member having air retaining engagement with an aperture in a tire rim adjacent the seated tire bead, said device having two positions of operative engagement with the rim, one position of operative engagement disposing an inner end of the device substantially flush with the inner rim surface facilitating air pressure seating of the tire bead against the rim flange, and the other position of operative engagement disposing an end to protrude beyond the inner rim surface adjacent the tire bead to support the same in seating engagement with the rim flange, said device further comprising an elongated cylindrical shank mounted in an externally threaded stud secured to the outer surface of a tire rim and slidably movable in a cylindrical passage in said stud aligned with the aperture in said rim, an internally threaded and axially apertured cap engaging the shank-stud assemblage and providing means for compressing a packing element disposed circumferentially of said shank between said cap and stud, rotation of said cap in one direction compressing said packing means providing air sealing around said shank while preventing axial movement thereof, rotation of said cap in the other direction relaxing pressure on said packing element to permit axial movement of said stud, and stop means at opposed ends of said stud limiting the extent of its inward and outward axial movements.

4. An air retaining and bead-seat-lock device as defined in claim 3, wherein the stop means at the outer end of said shank comprises an integral enlargement facilitating the grasping of said shank to impart axial movement thereto.

5. An air retaining and bead-seat-lock device as defined in claim 3, wherein the stop means at the outer end of said shank comprises an integral enlargement facilitating the grasping of said shank to impart axial movement thereto, and the stop means at the inner end of said shank comprises means forming a slight circumferential protrusion adapted to seat in a shallow recess circumferentially of the inner end of the aperture in said rim.

6. An air retaining and bead-seat-lock device as defined in claim 5, wherein the stop means at the outer end of said shank is an integral part of said shank, and the stop means at the inner end thereof is a split ring having snap engagement with an annular groove in said shank.

7. An air retaining and bead-seat-lock device as defined in claim 3, wherein said packing element is an O-ring.

8. An air retaining and bead-seat-lock device as defined in claim 3, wherein the length of said cylindrical shank is such as to protrude at least $\frac{1}{2}''$ beyond the inner surface of said rim when the outer stop means is in engagement with said cap.

* * * * *